US00RE39208E

(19) United States
(12) Reissued Patent
Sheerer et al.

(10) Patent Number: US RE39,208 E
(45) Date of Reissued Patent: Aug. 1, 2006

(54) METHOD OF TREATING MATERIAL IN A CONTINUOUS DIGESTER

(75) Inventors: Jay K. Sheerer, Queensbury, NY (US); Joseph R. Phillips, Glens Falls, NY (US); Jerry R. Johanson, San Luis Obispo, CA (US); John Pietrangelo, Queensbury, NY (US)

(73) Assignee: Andritz, Inc., Glens Falls, NY (US)

(21) Appl. No.: 10/829,477

(22) Filed: Apr. 22, 2004

Related U.S. Patent Documents

Reissue of:
(64) Patent No.: 6,375,796
Issued: Apr. 23, 2002
Appl. No.: 09/640,666
Filed: Aug. 18, 2000

U.S. Applications:
(62) Division of application No. 08/953,880, filed on Oct. 24, 1997, now Pat. No. 6,129,816.

(51) Int. Cl.
*D21C 3/26* (2006.01)
*D21C 7/00* (2006.01)

(52) U.S. Cl. ..... 162/19; 162/17; 162/237; 162/251; 162/248; 162/243

(58) Field of Classification Search ..... 162/237, 162/251, 17, 19, 248, 249, 243, 37, 39, 40, 162/41–45, 60; 422/218, 239, 292
See application file for complete search history.

(56) References Cited

U.S. PATENT DOCUMENTS 2,634,209 A * 4/1953 Nevin ..... 162/251
2,640,774 A * 6/1953 Ross et al. ..... 162/68
2,661,095 A * 12/1953 Koth ..... 210/433.1
2,845,347 A * 7/1958 Byrne ..... 162/42
2,998,064 A * 8/1961 Lang ..... 162/251
3,385,753 A * 5/1968 Rich ..... 162/251
3,397,110 A * 8/1968 Rosenblad ..... 162/42
3,700,548 A * 10/1972 Rich ..... 162/17
5,234,550 A * 8/1993 Ekholm et al. ..... 162/251

FOREIGN PATENT DOCUMENTS

| | | |
|---|---|---|
| CA | 807926 | * 3/1969 |
| FI | 950826 | * 2/1995 |
| SE | 90530 | 10/1937 |

* cited by examiner

*Primary Examiner*—Dionne A. Walls
(74) *Attorney, Agent, or Firm*—Nixon & Vanderhye, P.C.

(57) ABSTRACT

A comminuted cellulosic fibrous material treatment vessel assembly includes a substantially vertical vessel having a top, bottom, and outlet, and through which the material flows in a flow direction. The vessel preferably has a substantially cylindrical wall with at least one diameter-changing transition between the inlet and the outlet. A screen assembly is preferably provided at or just past the transition. The screen assembly comprises one or more annular screen surfaces diverging in the flow direction of the material, the angle of divergence being between about 0.5–10° to the vertical, and preferably substantially continuous. Providing such a screen assembly reduces the radial compression of material thereon, and increases the volume and rate of liquid that can flow through the material and be removed through the screen surface compared to a non-diverging screen surface (that is a right-cylindrical surface). The screen surface has openings of substantially uniform size, and preferably with a substantially uniform percentage of open area, in the flow path.

28 Claims, 4 Drawing Sheets

Fig. 4B
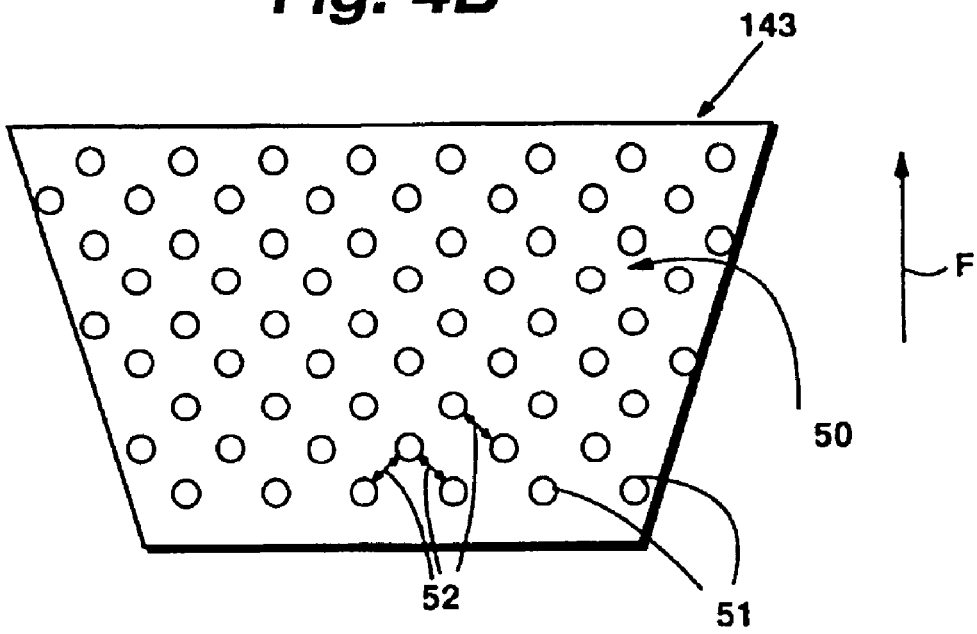
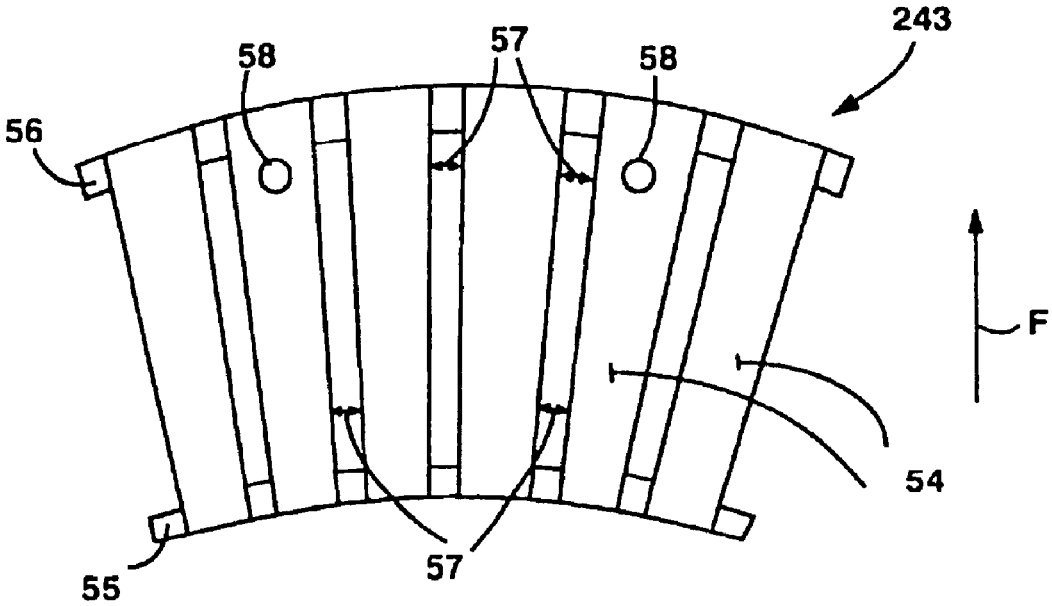
Fig. 5

METHOD OF TREATING MATERIAL IN A CONTINUOUS DIGESTER

Matter enclosed in heavy brackets [ ] appears in the original patent but forms no part of this reissue specification; matter printed in italics indicates the additions made by reissue.

CROSS-REFERENCE TO RELATED APPLICATIONS

This application is a divisional of application serial No. 08/953,880 filed Oct. 24, 1997, now U.S. Pat. No. 6,129,816.

BACKGROUND AND SUMMARY OF THE INVENTION

In the art of chemical pulping of comminuted cellulosic fibrous material, for example wood chips, the cellulose material is typically treated with cooking chemicals under pressure and temperature in one or more cylindrical vessels, known as digesters. This treatment can be performed continuously or in a batch mode. In the connection mode, chips are continuously fed into one end of a continuous digester, treated, and continuously discharged from the other end. In the batch method, one or more batch digesters are filled with chips and cooking chemical, capped and then treatment commences. Once the treatment is finished the contents of the batch digester are discharged. In either batch or continuous digesters, a slurry of comminuted cellulosic fibrous material and cooking chemical is treated in one or more a cylindrical vessels.

In both continuous and batch digesters, in order to uniformly distribute both temperature and cooking chemical, cooking liquor is typically circulated through the slurry of chips and liquor, typically referred to as "the chip column". This circulation is typically effected by some form of screen, located along the internal surface of the cylindrical vessel, a pump, a heater, and a return conduit. The screen retains the material within the digester as the liquor is removed, augmented with other liquors and/or a portion thereof removed, pressurized, heated, and then returned to the slurry in the vicinity of the screen or elsewhere. The proper operation of the digester and the production of uniform product having the best properties, for example, strength, are highly dependent upon the efficiency of this liquid circulation process.

The radial removal of liquor typically produces radial compression of the chip column in the vicinity of the screen assembly. In addition, the weight of the column of chips above the chips near the screen introduces another source of compression of the chips. Furthermore, the vertical movement of free liquor in the chip column, either upward or downward, can vary the compression load, or compaction, of the chip column. It is known in the art that this radial and vertical compression can interfere with the uniform movement of the chip column, which is so essential for the uniform treatment of the chips. For this reason, conventional digesters and screen assemblies are designed so that the diameter of the flow path increases just below the screen. This increase in diameter or "step-out" relieves the compression in the chip column and permits more uniform movement of the column. This step-out typically consists of a radial increase of about 6 inches to 2 feet. Copending application Ser. No. 08/936,047 filed Sep. 23, 1997 discloses several novel methods of accommodating this "column relief" while maintaining a relatively uniform vessel shell diameter.

The radial compression of the chip column against the surface of the screen, due to the radial flow of liquid, also aids in reducing pluggage of the screen surface. For instance, the normal pressure load on the screen surface in conjunction with the downward movement of the chip column acts to scour or "rub" the surface of the screen. This "rubbing" action helps to keep the apertures of the screen free of obstructions, for example, chips, pulp, or other debris. For instance, for vertically-oriented bar-type screens, the vertical rubbing action helps to dislodge any chips that may accumulate between the screen bars.

However, excessive radial compression can interfere with the uniform removal of liquid through the screen. As the radial flow increases, the compression induced by the flow in the chip column can compact the chip column making it difficult to pass liquid through the column. Therefore, the flow of liquid required to uniformly distribute chemical and temperature is typically limited. Thus, though some radial compression which produces a normal pressure on the surface of the screen is desired, this radial compression cannot exceed the compression that reduces the radial flow of liquid or hinders the axial flow of the chip column.

Typically, prior art screen assemblies comprise right cylindrical screen surfaces of relatively uniform diameter. These screen surfaces may comprise or consist of perforated plate, having slots or holes, or parallel-bar type construction having parallel apertures between the bars. These bars typically have a vertical orientation, but that may have various orientations including horizontal or at some oblique angle, for example, at a 45° angle to the vertical.

By analyzing the distribution of the forces within the chip column that are produced by the flow of liquid within the column it has been found according to the invention that by designing these screen assemblies so that they are not uniformly cylindrical, but slightly divergent, the radial compression loading in the chip column and on the screen surface can be reduced, and the volume and rate of liquid that can flow through the chip column and be removed through the screen can be increased. For example, screen surfaces having a slight increase in diameter in the direction of chip flow can reduce the compression load in the chip column and improve the performance of the screen assembly, and the digester in general.

Conical divergent screening surfaces are not unknown in the art of chemical pulping. For example, continuous hydraulic digesters typically include a conical screen surface at the very top of the digester, in the vicinity of where the slurry of cellulose is introduced, to remove excess liquid from the slurry and return it the digester feed system. In two vessel digester systems those screens, which are typically referred to as "bottom circulation" or "BC" screens, are conical in shape but to do not provide the function of the screens of the present invention. Since BC screens are typically located above the chip pile they do not experience the compressive loading that screens located lower down in the digester do. Also, the BC screens typically do not interfere with the movement of the chip slurry through the digester. Conical BC screens would not be used in the cooking or extraction zones as are the screens of the present invention.

One embodiment of this invention comprises or consists of a cylindrical screen assembly for removing liquid from a slurry of comminuted cellulosic fibrous material in a cylindrical vessel having a diameter that diverges in the direction of the of the movement of the slurry. This screen assembly can have an angle of divergence of between about 0.5 and 45°. However, it is believed that using angles of divergence greater than approximately 15° will diminish the rubbing action of the chip column on the screens that is desirable to prevent screen plugging. Though screens having larger angles of divergence can be used, it is preferred that the angle of divergence of the screen be limited to between about 0.5 and 10°, preferably, about 0.5 to 5°, to ensure that at least some form of normal rubbing force is exerted on the screen surface.

According to another aspect of the invention an assembly, per se, for use in screening liquid is provided. The assembly comprises: An annular screen assembly for separating liquid from solid material, the screen assembly having a screen surface with a top, a bottom, and a first internal diameter and a second internal diameter, and the screen assembly having an external diameter defining an annular volume exteriorly of the screen surface. The screen surface may comprise a substantially continuous cylindrical screen surface, or have a wide variety of other configurations as is conventional for screen surfaces per se, particularly for screens in chemical pulp digesters, and has a substantially constant opening size, and percentage of open area, in the flow direction.

According to another aspect of the present invention a method of treating a liquid slurry of comminuted cellulosic fibrous material under cooking conditions in a substantially vertical continuous digester having at least one substantially annular screen surface, and having a top and a bottom, to produce chemical pulp, is provided. The method comprises the steps of substantially continuously: (a) Introducing the slurry of comminuted cellulosic fibrous material into the digester adjacent the top thereof, to flow downwardly in the digester in a first flow path, having a first diameter. (b) Screening the slurry to remove liquid therefrom using the at least one screen surface, having a substantially constant screen surface opening size, and percentage of open area, in the first flow path. (c) During step (b) causing the slurry of comminuted cellulosic fibrous material to transition from the first flow path to a diverging second flow path [preferably having an initial second diameter, equal to or greater than the first diameter]. And, (d) removing the chemical pulp from adjacent the bottom of the digester.

The method also preferably comprises the further step (e), after (c) and before step (d), of causing the downwardly moving slurry to move in a third flow path having a diameter substantially equal to or larger than the second diameter. There is also preferably the further step of repeating steps (b), (c), and (e), at least once prior to step (d), and there is the further step of heating the liquid removed in the practice of step (c), and reintroducing the heated liquid into the digester adjacent where it was removed. As is conventional, some of the liquid flow may be removed, and/or other liquid added, prior to return to the digester.

The invention also comprises a comminuted cellulosic fibrous material treatment vessel assembly. The vessel includes the following components: A substantially vertical vessel having a top, a bottom, an inlet and an outlet, and through which comminuted cellulosic fibrous material flows in a flow direction, the vessel having a substantially cylindrical wall, and preferably with at least one diameter-changing transition between the inlet and outlet. And, a screen assembly (e.g. provided at or just past the transition), the screen assembly comprising an annular screen surface diverging in the flow direction of the comminuted cellulosic fibrous material, and engaging (contacting) the slurry, so as to reduce the radial compression of material thereon [and also preferably to increase the volume and rate of liquid that can flow through the material and be removed through the screen surface compared to a right cylindrical surface of the same construction], the screen assembly having screen surface openings with a substantially constant screen surface opening size [and preferably percentage of open area] in the flow direction.

Typically the outlet is adjacent the bottom of the vessel and the inlet is adjacent the top so that the screen surface diverges downwardly. The screen surface preferably diverges at a substantially constant angle to the vertical of between about 0.5–10°, most preferably between about 0.5–5°. The screen surface may comprise a first screen surface, and the vessel may further comprise a second annular screen surface substantially immediately downstream of the first screen surface in the direction of flow, the second surface also diverging in the flow direction (at the same angles as indicated above). Preferably the annular screen surfaces are continuous, however they can be "checkerboard" in configuration, or have other known configurations. The screen surfaces may have any conventional construction, such as perforated plate, bar, etc. For example, the screen surface comprises a perforated metal surface with perforations of substantially uniform size and density. As another example the screen surface comprises a plurality of bars spaced from each other in a direction substantially parallel to the flow direction, the spacing between the bars being substantially constant both from bar to bar and along the entire lengths thereof in the flow direction.

The invention also relates to a method of treating a liquid slurry of comminuted cellulosic material in a substantially vertical vessel (and preferably having at least one diameter transition). The method comprises the steps of: (a) Introducing the slurry into the vessel to flow substantially vertically therein in a flow direction. (b) while the slurry is flowing in the flow direction screening (e.g. at or just downstream of the diameter transition) the slurry to remove liquid therefrom while causing the liquid to diverge in the flow direction at an angle of between about 0.5–10° using the at least one screen surface, having a substantially constant screen surface opening size [and preferably percentage of open area] in the first flow path. And, (c) downstream of step (b) in the flow direction, removing the slurry from the vessel. Steps (a) through (c) may be practiced substantially continuously, and so that the flow direction is substantially downward. Also there may be the further step of repeating step (b) at least once prior to the practice of step (c).

It is the primary object of the present invention to provide a simplified screen assembly for a comminuted cellulosic fibrous material treatment vessel which allows for increased liquid removal and improved material movement through the vessel. This and other objects of the invention will become clear from an inspection of the detailed description of the drawings and from the appended claims.

BRIEF DESCRIPTION OF THE DRAWINGS

FIGS. 4A and 4B are schematic plan views of two different versions of a portion of an exemplary perforated plate screen surface, according to the invention, developed linearly; and FIG. 5 is a schematic plan view of a portion of an exemplary bar screen surface according to the invention.

DETAILED DESCRIPTION OF THE DRAWINGS

Figure 1:
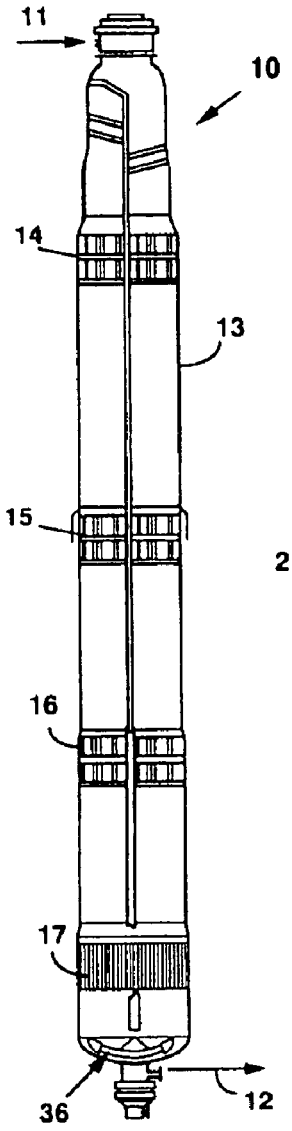
Fig. 1 (PRIOR ART)
FIG. 1 is a schematic side view of a prior art continuous digester having conventional right cylindrical screen assemblies.

FIG. 1 illustrates a typical prior art continuous digester 10 exhibiting right cylindrical screening surfaces associated with each screen assembly. [Though a vertical continuous digester is shown, it is to be understood that the present invention is applicable to any type of cylindrical digester, continuous or batch.] A slurry of comminuted cellulosic fibrous material and cooking chemical is introduced at the top of the digester 11 and a slurry of fully-cooked pulp and spent cooking liquor is discharged at the bottom 12. The digester 10 comprises a cylindrical shell, 13, and numerous right cylindrical screen assemblies 14, 15, 16 and 17. The typical geometry of right cylindrical screen 16 is illustrated in more detail in FIG. 2.

Figure 2:
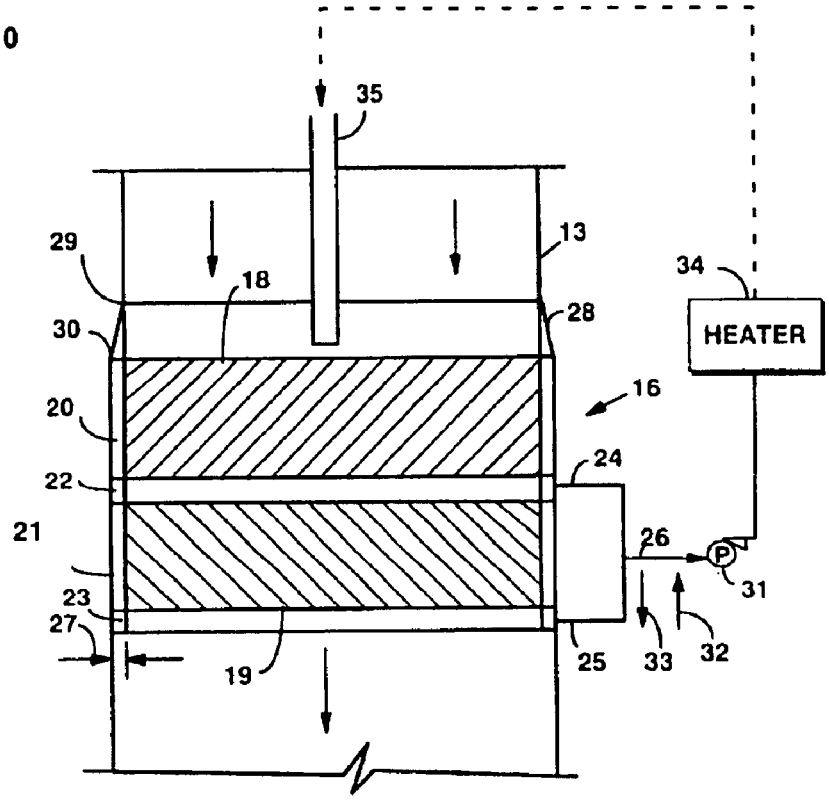
Fig. 2 (PRIOR ART)
FIG. 2 is a detail side cross-sectional view at one of the prior art right cylindrical screen assemblies of the digester of FIG. 1.

FIG. 2 illustrates a typical prior art screen assembly 16 having an upper screen 18 and a lower screen 19. The screens 18, 19 may be of various construction, such as perforated plate, for example, plates having circular holes or milled slots, or they may be constructed of parallel bars having parallel apertures between the bars. The slots or apertures may be positioned in various orientations such as vertically, horizontally, or any oblique angle; for example, the parallel bars may be oriented at a 45-degree angle from the vertical.

Behind each screen 18, 19 typically is a annular cavity 20, 21, for collecting the liquid withdrawn through each screen 18, 19. Beneath each annular cavity 20, 21, are smaller annular cavities 22, 23, commonly referred to as "internal headers", for collecting the liquid from cavities 20, 21, and discharging it to liquor removal conduits 24, 25. Though these cavities are shown as being located internal to the shell 13, they may also be located external to the shell, that is, "external headers" may be used. Cavities 20, 22 and cavities 21, 23, typically communicate via apertures having specifically-designed dimensions, that is, orifice holes, in order to promote uniform removal of liquid through each screen, as is conventional. Conduits 24, 25 typically join to form a single conduit 26 which communicates with a re-circulation pump 31. Beneath each screen assembly 16 the diameter of the shell 13 is increased at step out 27. This step-out helps to relieve the compressive forces formed in the chip column due to the vertical compression of the weight of the chips and the radial compression of the liquor removed through the screens. This radial increase may range from about 1 to 36 inches, but is typically between about 6 and 24 inches.

As is conventional, FIG. 2 illustrates the return system associated with an exemplary screen assembly 16. Some of the screen assemblies will have merely extraction, or liquid removal, but typically two or more of the screen assemblies in the digester 10 have the pump 31 connected to the conduit 26 to withdraw liquid into the conduit 26, with potentially some liquor added as indicated schematically at 32 in FIG. 2, and/or some liquor withdrawn as indicated schematically at 33 in FIG. 2. The added liquid in 32 may be white liquor, or make-up liquor (e.g. filtrate) having lower dissolved organic material content than the withdrawn liquor in line 33, or it may have any other compositions known in the art.

From the pump 31 the liquid is pumped typically through a heater 34, and the heated liquid is reintroduced into the digester 10 using an internal conduit 35 so that the withdrawn liquor is returned near the area where it was removed (typically just above the screen 18). There are a wide variety of different conventional structures for this purpose.

Figure 3:
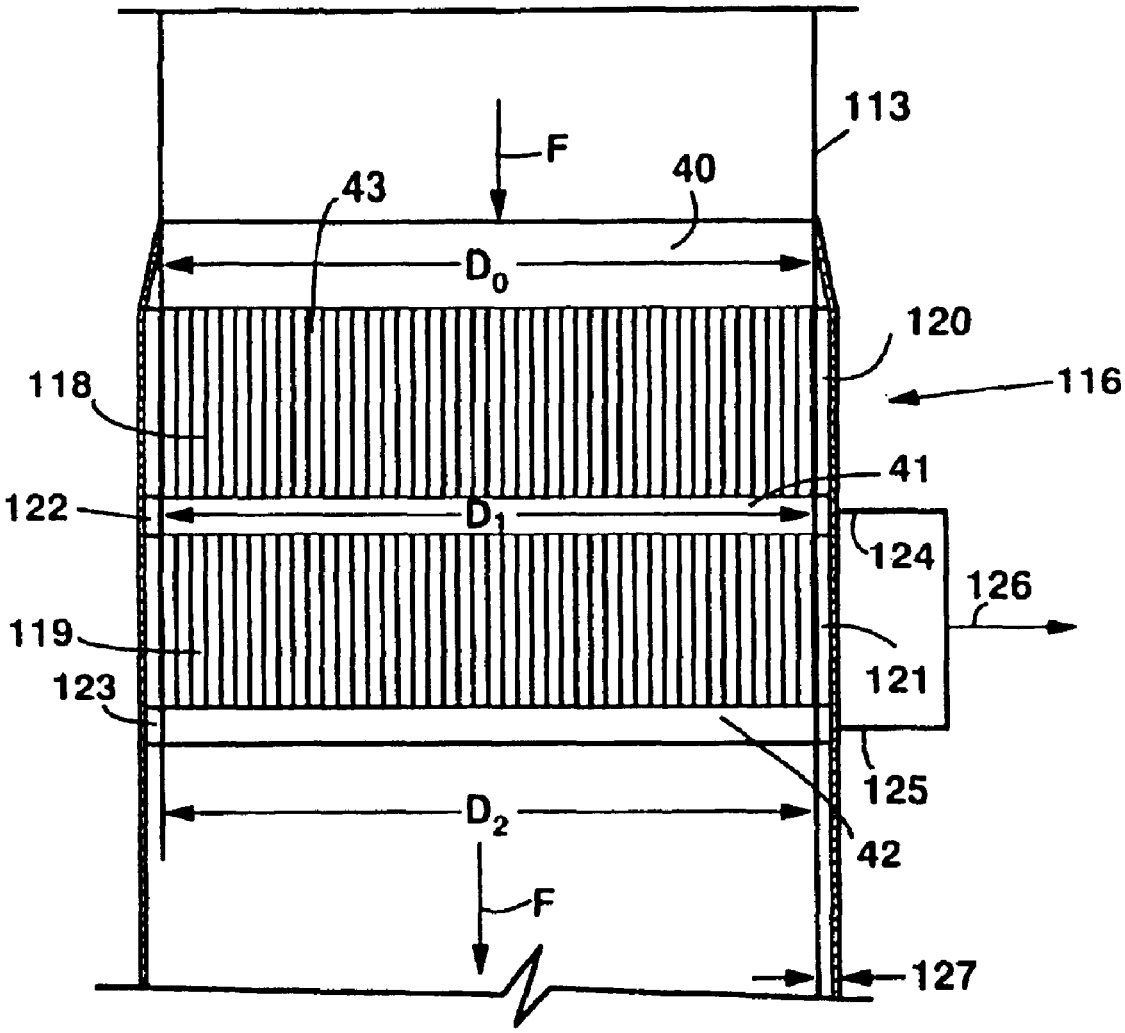
FIG. 3 is a view like that of FIG. 2 only for a screen assembly according to the invention.

FIG. 3 illustrates a typical digester screen assembly according to the present invention. Several of the features shown in FIG. 3 are similar or identical to those shown in FIGS. 1 and 2; these features are distinguished from the earlier ones by the preferred numeral "1".

Shell 113 contains a screen assembly 116. The screen assembly 116 is shown as a double screen 118, 119 but it is to be understood that the screen assembly 116 may comprise or consist of one, two, or more screens. Screens 118, 119 may be of the various types of constructions as described for screens 18, 19 above, but unlike screens 18, 19, screens 118, 119 are tapered such that they diverge in the direction of the slurry flow, shown by the arrows F. This divergence is typically at least by about 0.5 degrees from the vertical and is preferably at most approximately 10 degrees from the vertical, and is preferably substantially uniform and continuous. For example, the upper screen 118 has an upper internal diameter $D_0$ and a lower internal diameter $D_1$ greater than $D_0$, preferably with a substantially constant taper between them. Also, screen 119 has an upper internal diameter essentially equal to $D_1$ and a lower internal diameter $D_2$, greater than $D_1$, preferably with a substantially constant taper between them.

Though the blank plates 40, 41, 42, are shown as right-cylindrical cylinders, these may also be divergent conical sections. As an alternative, only one of the two screens 118, 119 may diverge while the other may be essentially cylindrical. That is, $D_1$ may be essentially equal to $D_0$ and $D_2$ be greater than $D_1$; or $D_1$ may be greater than $D_0$ and $D_2$ be essentially equal to $D_1$.

As described above, the divergent flow path provided by the screens 118, 119 sufficiently reduces the compression in the chip column due to the radial removal of liquid that the potential for hang-up of the chip column is reduced or the volume of liquid that can be removed increased compared to conventional right-cylindrical screens.

Screen assembly 116 typically includes annular cavities 120, 121 and internal headers 122, 123 which discharge to conduits 124, 125 as is conventional. Cavities 120, 121 and cavities 122, 123 typically communicate via multiple orifices (not shown). As in FIGS. 1 and 2, the column compaction may be relieved by introducing a diameter step increase 127, or the like, below the screen 119.

Though the screens 118, 119 are each shown as having a continuously cylindrical screen surface, 43, it is to be understood that the screen surface 43 may not be continuous or cylindrical. For example, the screen surface 43 may also comprise multiple individual circular screens, or the screen surface 43 may comprise alternating screen surfaces and blank plates, commonly referred to as a "checker board pattern". More than one such screen assembly 116 can be—and almost always is—used in the same vessel 113. The conduit 126 of the screen assembly 116 can also include a recirculation System like the components 31–35 in FIG. 2.

In a method according to the present invention, utilizing the apparatus of FIG. 3, a slurry of comminuted cellulosic fibrous material which flows in the direction F in the vertical vessel 113 having at least one diameter transition (at 40), comprises the following steps: Introducing the slurry into the vessel 113 to flow substantially vertically therein in a flow direction F. At or just downstream of the diameter transition (40), screening the slurry (using the diverging screens 116, and/or 119) to remove liquid therefrom (which is ultimately withdrawn in the conduit 126) while causing the slurry to diverge in the flow direction at an angle of between about 0.5–10° (the same angle as the angle of divergence of the screen surfaces 43). And, downstream of the liquid as indicated in FIG. 3, removing the slurry from the vessel. The screen step may be repeated at least once prior to the removal of the slurry from the vessel. Also the removed liquid in conduit 126 may be heated and reintroduced (and some liquid withdrawn therefrom and/or other liquid inserted into the flow) as indicated by the elements 31–35 of FIG. 2.

It is highly desirable that the screen surfaces used in the practice of the invention have substantially constant opening size, and percentage of open area, in the flow direction of the slurry. That is, rather than using bars with an increasing slot spacing in the direction of flow (and therefore necessarily an increase in percentage of open area), such as is provided in the strainer of U.S. Pat. No. 3,385,753, if bars are used according to the invention the slot spacing is kept substantially constant in the flow direction. When perforated screen surfaces are used, the size and spacing of the openings are kept substantially constant, so that, again, the percentage of open area in the screen is kept substantially constant in the flow direction. This feature of the invention can best be seen with respect to the two exemplary embodiments illustrated schematically in FIGS. 4 and 5.

Figure 4A:
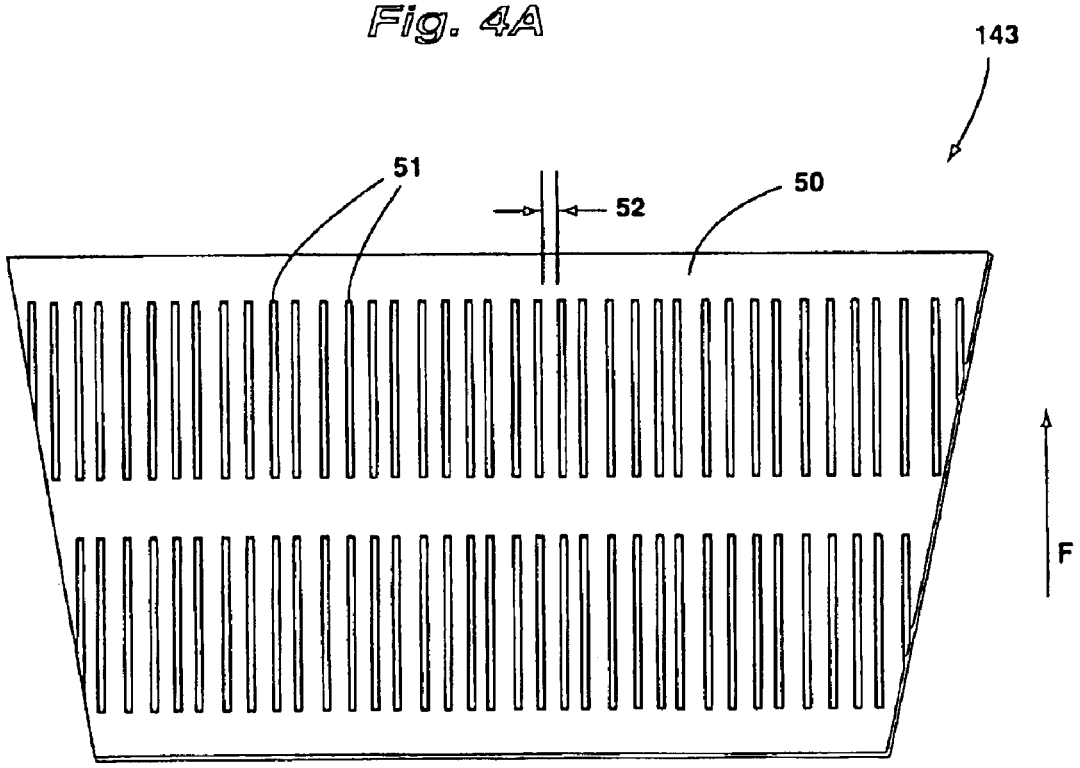

FIGS. 4A and 4B are each a schematic representation (exaggerated in proportion for clarity of illustration) of a linear development of a portion of a screen assembly 143 that may be used according to the invention, which has a screen surface 50 in the form of a perforated metal plate surface. The screen surface 50 has a plurality of perforations 51 (typically slots, as in FIG. 4A, or circular holes, as in FIG. 4B, although other shapes could be used) spaced from each other a distance 52. Whatever the size of the perforations 51, and their spacings 52, the size and spacings are kept substantially constant in the flow direction F so that the percentage of screen open area is kept the same as the slurry moves in the direction F. Thus, it is simply the gradual increase in diameter of the screen surface 50 (when in annular configuration) that allows relief of compaction, and the consequent increase in screen surface area (without the need for change in the percentage of open area, or screen opening size) that allows more liquid removal, according to the invention. That is, the surface 50 has perforations 51 of substantially uniform size and density.

The same results achieved for the embodiments of FIGS. 4A and 4B are achievable according to the invention for any other conventional type of screen assembly. For example, with respect to FIG. 5, a section of a bar screen assembly 243 that may be utilized according to the invention is schematically illustrated, again greatly exaggerated in proportion for clarity of illustration. The bar screen assembly 243 includes a plurality of metal bars 54 which are typically held together (when in annular configuration) by two or more rings 55, 56. The rings 55, 56 may be provided at any locations along the bars 54, but in FIG. 5 are shown at the top and bottom thereof. Each set of bars 54 has a spacing 57 in a direction substantially parallel to the flow direction F. The spacings 57 are substantially equal to each other, and substantially uniform in the direction F. Also, the amount of open area of the screen preferably remains the same.

The uniform spacings 57 may be provided by using bars having a substantially trapezoidal (rather than substantially rectangular) shape in plan. Again, compaction is relieved solely by the increase in diameter of the screen assembly 243 in the flow direction F. The percentage of screen open area may be maintained the same by providing appropriate perforated screen surface sections between the bar sections illustrated in FIG. 5, or by providing openings 58 in selected ones of the bars 54 at the substantially most remote portions thereof in the direction of flow F. In this way an increase in the amount of liquid that can be removed is achieved by the increase in the screen surface area in the direction F without the need for increasing the spacing 57 size, or percentage of open area.

In all of the FIGS. 4A, 4B, and 5 embodiments a checkerboard configuration, or other blanked screen portions, or the like, may be provided where desired, just as discussed above with respect to FIG. 3.

As another alternative for the screen assembly surface according to the invention, a screen surface with slanted apertures (for example milled slots at a 30–60 degree angle, e.g. about 45 degrees, to the vertical) may be used, such as described in Finnish application 950626 (the disclosure of which is hereby incorporated by reference herein, and a copy of an English language translation of which is provided as an appendix hereto).

It will thus be seen that according to the present invention an advantageous digester, screen assembly, and method of treating a liquid slurry to produce chemical pulp, have been provided. The invention reduces the potential for the liquor removal screens to interfere with the movement of the cellulose material slurry while increasing the volume of liquid can be removed. It is to be understood that though the discussion above generally refers to the vessels in which the present invention can be used as digesters, this invention can be applied to any treatment vessel for treating a slurry of comminuted cellulosic fibrous material that requires that liquid be removed from the slurry. These include impregnation vessels, pretreatment vessels, washing vessels, and bleaching vessels.

While the invention has been herein shown and described in what is presently conceived to be the most practical and preferred embodiment thereof, it will be apparent to those of ordinary skill in the art that many modifications may be made thereof within the scope of the invention, which scope is to be accorded to the broadest interpretation of the appended claims so as to encompass all equivalent structures and methods.

What is claimed is:

1. A method of treating a liquid slurry of comminuted cellulosic fibrous material under cooking conditions in a substantially vertical continuous digester, having at least one substantially annular screen surface, said digester having a substantially cylindrical wall with at least one diameter-changing transition below the cylindrical wall, said method comprising [the steps of] substantially continuously:

(a) introducing the slurry of comminuted cellulosic fibrous material into the digester adjacent the top thereof, to flow downwardly in the digester in a first cylindrical flow path having a first diameter and defined by the cylindrical wall;

(b) screening the slurry to remove liquid therefrom using the at least one screen surface, having a substantially constant screen surface opening size and percentage of open area, in the first flow path;

(c) during step (b) causing the slurry of comminuted cellulosic fibrous material to transition at the at least one diameter-changing transition from the first cylindrical flow path to a first diverging flow path having an initial second diameter;

(d) after step (c), moving the slurry downward in a second cylindrical flow path, and (e) removing the chemical pulp from adjacent the bottom of the digester.

2. A method as recited in claim 1 wherein the second diameter is equal to or greater than the first diameter and comprising the further step (f), after step (d), and before step (e), of causing the downwardly moving slurry to move in a second diverging flow path having an initial diameter equal to or greater than the second diameter.

3. A method as recited in claim 2 comprising the further step of repeating steps (b), (c), (d), and (f) at least once prior to step (e).

4. A method as recited in claim 3 wherein both the first and second diverging flow paths diverge at a substantially constant angle to the vertical of between about 0.5–10°.

5. A method as recited in claim 3 wherein the second flow path diverges at a substantially constant angle to the vertical of between about 0.5–5°.

6. A method as recited in claim 1 comprising the further step of heating the liquid removed in the practice of step (c) and reintroducing the heated liquid into the digester adjacent where it was removed.

7. A method as recited in claim 1 wherein the first diverging flow path diverges at an angle to the vertical of between about 0.5–10°, and step (b) is practiced using a substantially continuous screen surface.

8. A method as recited in claim 1 wherein the first diverging flow path diverges at a substantially constant angle to the vertical of between about 0.5–5°.

9. A method as recited in claim 2 comprising the further [step of] heating the liquid removed in the practice of step (c) and reintroducing the heated liquid into the digester adjacent where it was removed.

10. A method as recited in claim 2 wherein the second flow path diverges at an angle to the vertical of between about 0.5–10°, and step (b) is practiced using a substantially continuous screen surface.

11. A method as recited in claim 2 wherein the second flow path diverges at a substantially constant angle to the vertical of between about 0.5–5°.

12. A method as recited in claim 8 comprising [the further step of] heating the liquid removed in the practice of step (c) and reintroducing the heated liquid into the digester adjacent where it was removed.

13. A method of treating a liquid slurry of comminuted cellulosic material in a substantially vertical vessel having at least one substantially annular screen surface, said method comprising [the steps of]:

(a) introducing the slurry into the vessel to flow substantially vertically therein through a first cylindrical passage defined by a cylindrical section of the vessel, and said slurry moving in a flow direction;

(b) while the slurry is flowing in the flow direction and in a diameter transition section of the vessel, below the first cylindrical passage screening the slurry to remove liquid therefrom while causing the liquid to diverge in the flow direction at an angle of between about 0.5–10° using the at least one screen surface[, having a substantially constant screen surface opening size]; and (c) downstream of (b) in the flow direction and after the slurry flows through a second cylindrical passage below the diameter transition section, removing the slurry from the vessel.

14. A method as recited in claim 13 wherein steps (a)–(c) are practiced substantially continuously, and so that the flow direction is substantially downward.

15. A method as recited in claim 13 wherein the vessel has at least two diameter transitions, and wherein step (b) is practiced at or just downstream of each diameter transition prior to the practice of step (c).

16. A method as recited in claim 13 wherein (b) is practiced to cause the liquid to diverge in the flow direction at an angle of between about 0.5–5°.

17. A method as recited in claim 14 wherein the vessel has at least two diameter transitions, and wherein step (b) is practiced at or just downstream of each diameter transition prior to the practice of step (c).

*18. A method of treating a liquid slurry of comminuted cellulosic material in a substantially vertical vessel having at least one substantially annular screen surface, said method comprising:*

*(a) introducing the slurry into the vessel to flow substantially vertically therein through a first cylindrical passage defined by a cylindrical section of the vessel, and said slurry moving in a flow direction;*

*(b) while the slurry is flowing in the flow direction and in a diameter transition section of the vessel, below the first cylindrical passage screening the slurry to remove liquid therefrom while causing the liquid to diverge in the flow direction at an angle of between 0.5° and 5° using the at least one screen surface; and*

*(c) downstream of (b) in the flow direction and after the slurry flows through a second cylindrical passage below the diameter transition section, removing the slurry from the vessel.*

*19. A method as recited in claim 18 wherein steps (a)–(c) so that the flow direction is substantially downward.*

*20. A method as recited in claim 18 wherein the vessel has at least two diameter transitions, and wherein step (b) is practiced at or just downstream of each diameter transition prior to the practice of step (c).*

*21. A method as recited in claim 18 wherein the at least one substantially annular screen surface comprises an assembly of bars each arranged in a direction aligned with the flow direction.*

*22. A method of treating a liquid slurry of comminuted cellulosic material in a substantially vertical vessel having at least one substantially annular screen surface, said method comprising:*

*(a) introducing the slurry into the vessel to flow substantially vertically therein through a first cylindrical passage defined by a cylindrical section of the vessel, and said slurry moving in a flow direction;*

*(b) while the slurry is flowing in the flow direction and in a diameter transition section of the vessel, below the first cylindrical passage screening the slurry to remove liquid therefrom while causing the liquid to diverge in the flow direction at an angle of approximately 0.5° using the at least one screen surface; and*

*(c) downstream of (b) in the flow direction and after the slurry flows through a second cylindrical passage below the diameter transition section, removing the slurry from the vessel.*

*23. A method of treating a liquid slurry of comminuted cellulosic material in a substantially vertical vessel having at least one substantially annular screen surface, said method comprising:*

*(a) introducing the slurry into the vessel to flow substantially vertically therein through a first cylindrical passage defined by first cylindrical section of the vessel;*

*(b) moving the slurry in a flow direction through the first cylindrical and to a diameter transition section of the vessel that is below the first cylindrical passage, wherein a vertical length of the diameter transition section is substantially shorter than a length of the first cylindrical section;*

(*c*) *screening the slurry to remove liquid therefrom while causing the liquid to diverge in the flow direction at an angle of between 0.5° and 5° using the at least one screen surface;*

(*d*) *moving the slurry through a second cylindrical passage have a diameter substantially greater than a diameter of the first cylindrical passage, and wherein the second cylindrical passage is immediately downstream of the diameter transition section; and*

(*e*) *downstream of the second cylindrical passage below the diameter transition section, removing the slurry from the vessel.*

*24. The method as in claim 23 wherein the second cylindrical passage has a length substantially greater than the diameter transition section.*

*25. The method as recited in claim 23 wherein steps* (*a*)–(*e*) *so that the flow direction is substantially downward.*

*26. The method as recited in claim 23 wherein the vessel has at least two diameter transitions, and wherein the screening is practiced at or just downstream of each diameter transition.*

*27. The method as recited in claim 23 wherein the at least one substantially annular screen surface comprises an assembly of bars each arranged in a direction aligned with the flow direction.*

*28. The method as in claim 27 wherein the bars are trapezoidal and a gap between adjacent bars is substantially uniform along a length of the bars.*

* * * * *